Nov. 25, 1958   J. C. BELLAMY ET AL   2,861,743
COMPUTER
Filed May 17, 1955   2 Sheets-Sheet 1
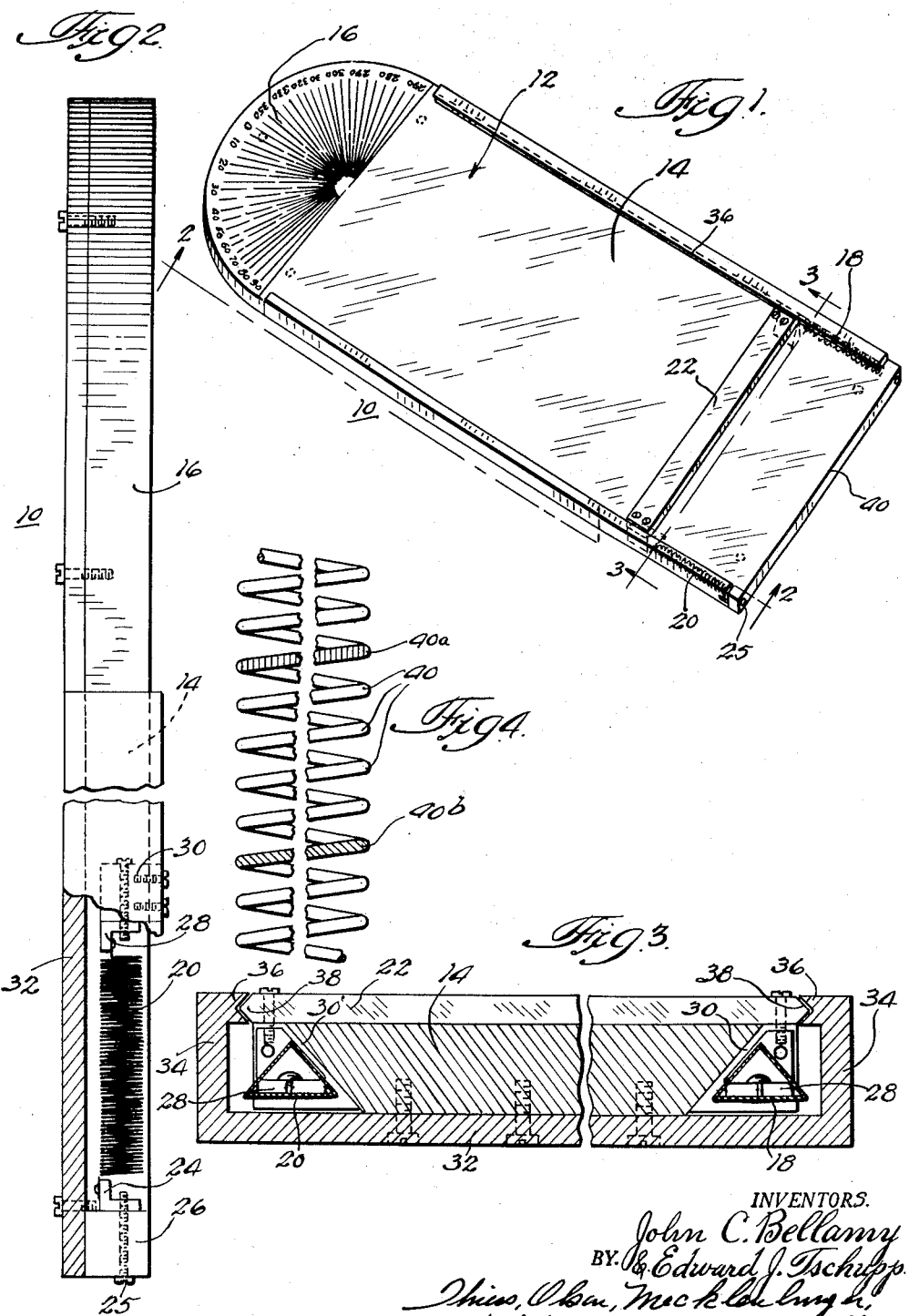
INVENTORS.
John C. Bellamy
BY & Edward J. Tschupp

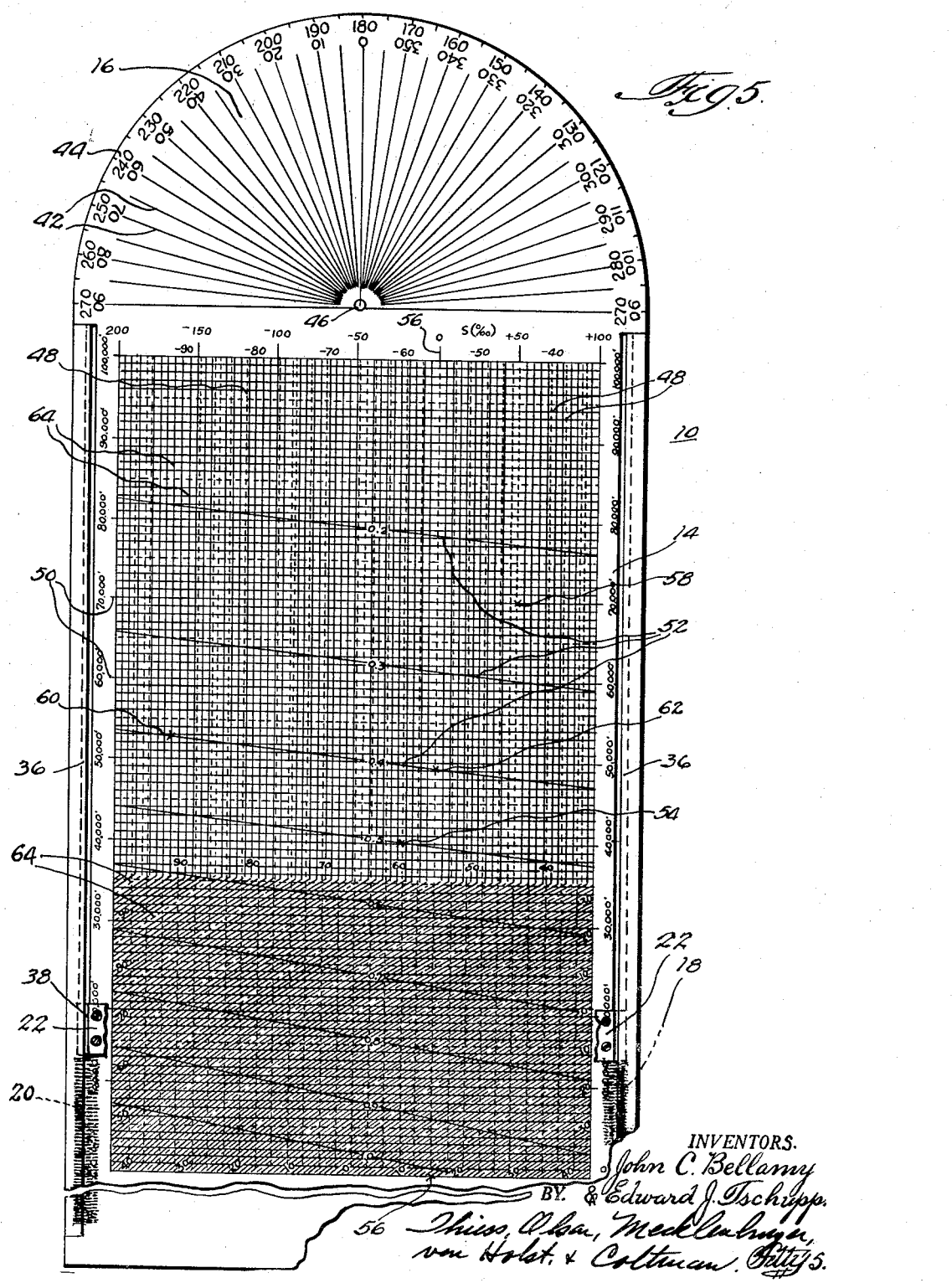

United States Patent Office 2,861,743
Patented Nov. 25, 1958

2,861,743

COMPUTER

John C. Bellamy, Barrington, and Edward J. Tschupp, Libertyville, Ill., assignors, by mesne assignments, to Cook Electric Company, Chicago, Ill., a corporation of Delaware Application May 17, 1955, Serial No. 508,896

10 Claims. (Cl. 235—61)

This invention relates to a computer and more particularly to an improved computer especially adapted for navigational and meteorological studies.

It is a principal object of this invention to provide an improved computer adapted for air navigation and meterorological work.

The prior art is replete with devices used for conventional navigational computing and plotting. However, most of these devices fail completely to anticipate the requirement of modern high speed travel. Customarily such devices have one or more fixed scales and consequently require calibration or the assignment of values to arbitrary scale divisions before the computer or plotter may be effectively used. Thus, a navigator finds it necessary first to arrive at an appropriate scale for use with the particular charts, maps, or tables which he has before him. Then he must select values for the scale divisions on the plotter and in all subsequent work keep in mind the assigned values of the various scale divisions. Furthermore, all computers and plotters heretofore known have been adapted for low speed, low altitude navigation, and have made no provision for the problems which are unique to high speed stratospheric travel.

It is therefore a further object of this invention to provide an improved computer possessing versatility for direct use with any chart, map or table.

It is a further object of this invention to provide an improved computer employing one or more extensible linear scales whereby the device may be readily calibrated for use with charts having any desired scale factor.

It is a further object of this invention to provide an improved computing and plotting instrument combining various elements in an integrated device wherein the various parts cooperate to produce an accurate result with greater speed and facility than heretofore possible.

It is another object of this invention to provide an improved navigational instrument including a cooperating thermodynamic chart whereby said instrument is especially adapted for high altitude navigation.

It is still another object of this invention to provide an improved computer which includes two variable linear scales, the individual increments of which bear a predetermined size and position relationship to one another at all times.

It is still another object of this invention to provide an improved computer including a linearly extensible scale and a chart having a plurality of spaced parallel effects thereon disposed in a grid-like manner whereby the chart in combination with the base of the computer and the scale may be used as a straight edge, plotter, divider, computer or parallel rule.

It is a further object of this invention to provide an improved computer which combines in an integral structure a thermodynamic chart, a plurality of variable scales and a protractor, the computer being especially useful in navigational plotting, and especially adapted for high altitude pressure pattern navigation.

Further and additional objects and purposes of this invention will become manifest from a consideration of this specification, the accompanying drawings and the appended claims.

In one form of this invention a transparent planar member is provided having two parallel edges and a semicircular end portion. A helical spring is provided along each of said parallel edges, each of said springs having one end fixed to one end of said base and the otherwise free end affixed to a common slider whereby motion of the slider will effect substantially uniform and equal elongation of the two variable spring scales. A thermodynamic chart adapted for use with the variable scales is imprinted on the body portion of the base between the parallel edges, and indicia are printed about the periphery of the semicircular portion to indicate angular position.

For a more complete understanding of this invention reference will now be made to the accompanying drawings wherein:

Figure 1 illustrates in perspective one embodiment of this invention;

Fig. 2 is a side view of the embodiment of Fg. 1 shown partially in section;

Fig. 3 is a sectional view of the embodiment of Fig. 1 taken along the line 3—3 thereof;

Fig. 4 is an enlarged partial view of the extensible linear scale employed in the embodiment of Fig. 1; and Fig. 5 is a plan view of the embodiment of Fig. 1 showing the various indicia and effects which may be imprinted thereon.

Referring now to the drawings and more particularly to Fig. 1 a computer and plotter 10 is shown having a base member 12 comprising a generally rectangular body portion 14 and an integral semicircular end portion 16. A thermodynamic chart is printed on the body portion 14 whereby certain necessary navigational information for high altitude and pressure pattern navigation will be readily available when using the device of this invention. While various thermodynamic charts may be employed for this purpose, provided the scales can be oriented in the manner described hereinafter, one particular chart belived to be especially adapted therefor is the pastagram. In the pastagram, pressure altitude is plotted as a series of parallel lines normal to the elongated parallel edges of the base 14, while "S," the specific temperature anomaly, is plotted as a plurality of lines, all of which are parallel to the elongated edges of the base 14. The pastagram and its many uses are described in an article entitled, "The Use of Pressure Altitude and Altimeter Corrections in Meteorology" by John C. Bellamy, which appears in the March 1945 issue of The Journal of Meteorology, volume 2, number 1. The particular uses of the chart in cooperation with the other features of this invention will be described more particularly with respect to Fig. 5.

Helical springs 18 and 20 are mounted along each of the parallel edges of the base 14 and have free ends connected to a common slider 22 which may be positioned at any desired point on the base. The variable scales 18 and 20 will have a plurality of convolutions determined by the incremental scale divisions which are desired. In the particular embodiment herein described the linear scale 20 is provided with 60 convolutions, while the scale 18 comprises 100 convolutions. The advantage of this particular relationship will be clear from a description of the purposes and uses of the computer which will follow.

As shown more clearly in Figs. 2 and 3 the helical springs 18 and 20 are secured at the end of the base 14 by a small mounting bracket 24 which is secured against an end stud 26 formed on the base 14 by screws 25. While in this embodiment the helical springs 18 and 20 ar shown to have a triangular cross section, any desired shape may be employed. It has been found that this particular shape renders a scale which is easily read from most viewing positions and has the desired physical characteristics to withstand continued use under adverse conditions. The free end of each of the helical springs 18 and 20 is fixed to a bracket 28 secured in turn to a guide 30 which slidably engages the edges of base 14 and defines the end portions of the slider 22. The base 14 has a generally trapezoidal cross section and the slider 22 overlies the longer base thereof. The guides 30 have similar trapezoidal cross sections which cooperate with the trapezoidal base in sliding locked engagement.

The guides 30 and the helical springs 18 and 20 are protected by a transparent enclosing member 32, a cross section of which is clearly shown in Fig. 3. The cover 32 comprises a planar portion somewhat wider than the base 14 with two elongated flanges 34 extending upwardly therefrom having lips 36 disposed inwardly to partially overlie the planar portion 32. The slider 22 has tapered edges 38 which cooperate with correspondingly recessed edges of the lips 36 to provide an intimate fit therebetween whereby the slider 22 may be slidably maintained substantially parallel to the end 40 of the base 14. Furthermore, the slider 22 is frictionally engaged by the lips 36, thus maintaining the slider at any desired position on the computer. While various mounting means will occur to one skilled in this art, the described construction is satisfactory for most applications.

As shown in Fig. 4, the resilient scales 18 and 20 are marked in some appropriate manner whereby the scale divisions are clearly indicated. For example, the majority of the convolutions 40 may be in their natural color or some dark hue, while every tenth convolution 40a may be colored or otherwise marked to indicate clearly the decimal relationship therebetween. For example, the convolution 40a may be colored red or a small numeral affixed thereto. Similarly the fifth convolution 40b of each set of ten may be colored in an appropriate manner to indicate clearly to the navigator the relationship of said convolution to the whole spring. For example, the fifth convolution 40b may be painted white.

Referring now to Fig. 5, the indicia printed on the face of the computer 10, the cooperation of the indicia with the slider 22, and the manner in which the computer is used in flight will be explained. The semicircular end 16 of the computer has a plurality of radial lines 42 imprinted thereon, each one representing a 5° angular increment. Alternate radial effects 42 are identified with numeral indicia 44. The center of the semicircular portion may be formed with a grommet or provided with an aperture 46, whereby the computer may be fixed to a chart or a map at this central point and rotated in such a manner that the elongated edges of the base 14 align with a particular predetermined base line, course or heading, the angular orientation of which will be indicated by the particular radial line 42 which is aligned with a meridan on the chart. This technique is well understood by those familiar with the use of a conventional protractor. The various uses to which this computer may be put include use as a straight edge, as a protractor, as a parallel rule or divider as each of the S lines 48 of the thermodynamic chart is parallel to the longitudinal edges of the base 14. Furthermore, each of the pressure altitude lines 50 is perpendicular to the S lines and to the edges of the base 14.

The computer of this invention may also be employed to determine ground speeds by the use of the variable scales in conjunction with a map in the following manner. The computer is placed on the map with the first convolution of the variable springs overlying one terminal of the distance traversed in a given time interval. The slider 22 is manually extended and so positioned that the coil corresponding to the number of minutes of time required to traverse the given distance lies at the other terminal of the distance traversed as it appears on the underlying map. For example, if 34 minutes were required to traverse a given distance, the first convolution is placed over the starting point on the map, and the 34th convolution is placed over the terminal point on the map. Then the distance between the first coil of the scale and the sixtieth coil thereof will be the distance traversed in one hour and consequently will represent the actual ground speed of the aircraft. If this distance is measured along a meridian in accordance with one conventional practice, the number of minutes of latitude between the first and the sixtieth coils will correspond to the ground speed of the aircraft in knots. For example, if the aircraft covered a distance on the chart of 100 miles in an elapsed time of fifteen minutes, placing the base of the variable scale on the starting point and the fifteenth convolution of the scale on the instantaneous position of the aircraft fifteen minutes later, the sixtieth convolution will be positioned at a distance equivalent to four hundred miles from the base when using that particular chart. This will represent the ground speed. Conversely, if ground speed or true air speed is the known variable, the variable scale is adjusted against a map meridian or calibration scale so that the ground speed is enclosed between the base and the sixtieth convolution. Then the distance which can be traversed in any given number of minutes will be represented by the distance on the underlying map between the base of the scale spring and the coil which represents said particular number of minutes.

To determine the time interval for a particular flight with true ground speed known, the extensible scale is positioned to delimit between the base and the sixtieth coil a distance on the underlying map equivalent to the speed (i. e. the distance travelled in one hour). Thereafter the flight time for a selected distance on the underlying map may readily be read from the variable scale as a number of convolutions of the spring, which, in turn, represents the number of minutes necessary to traverse the distance. The variable scales are also of advantage in determining fuel consumption, knowing the time or the distance of a given flight. This calculation is performed in the same manner that ground speed and flight time are determined. If, under a given set of cruising conditions fuel consumption in pounds per hour is known, a number of convolutions representing this value may be set over the distance traversed in one hour as represented on an underlying map. Fuel consumption for any given space interval on the map may then be read directly from the variable scale.

The dual correlated linearly extensible scales of this invention are extremely useful in reading certain data directly from a chart and thus avoiding interpolation. For example, in the particular embodiment described, the scales 18 and 20 have 100 and 60 convolutions respectively whereby the scale 20 may be read directly in minutes where the overall length of the scale represents one hour, and the scale 18 may be read directly in percentages of the distance or time represented by the overall length of the scales.

The scales 18 and 20 may also be employed for calculation of fuel mileage and aircraft range. The range will be represented by the space defined between the base of the variable scale and the convolutions representing one-half the total capacity of the aircraft's fuel tanks. Similarly the linear distance between two successive convolutions will represent the fuel consumption in distance per unit of capacity.

It is believed clear that this device is well adapted for the solution of wind vector and related problems in much the same manner that computers have been so employed heretofore.

The computer taught by this invention is especially useful for planning high altitude and pressure pattern navigation. Therein it is desirable to plot a course determined by the geostrophic wind velocity as determined from a meteorological map having appropriate contour lines thereon. By simply adjusting the variable scale so that the contour spacing is divided equally by the spring coils, for example, if a contour line is drawn for every 100 foot variation in pressure altitude, by placing 100 coils of the variable scale between two adjacent contour lines and then laying the computer over a scale of geostrophic distances, the number of convolutions of the coil 18 will be a measure of pressure drop and consequently normal geostrophic wind velocity, this number representing the wind velocity in knots.

An important use of the computer taught by this invention is the calculation of corrected air speed in high altitude flight. The correction of indicated air speed for the variations in air density can be made directly with the computer. The lines 52 which cross the pressure altitude lines at an angle of approximately 15° are marked with decreasing decimal value from the bottom of the computer to the top as illustrated in Fig. 5. These lines are representative of air density correction factors and are utilized in computation in the following manner. In flight, the normal aircraft instruments render an indication of pressure altitude and ambient temperature. Pressure altitude is that altitude indicated on a pressure sensitive device such as an aneroid barometer and must be corrected to compensate for abnormal meteorological conditions such as variations in the air temperature. The pressure altitude and temperature define a particular point on the thermodynamic chart. For example, if the pressure altitude is 40,000 feet and the ambient temperature is −60° C. the point 54 is defined on the thermodynamic chart. This point indicates a density correction factor of .5. By placing the variable scale 18 on a map or chart in such a manner that a distance along the meridian equal in length to the air speed is delimited by a number of coils equal to the correction factor multiplied by 100, i. e. 50, then the true air speed will be indicated on the underlying map at the one-hundredth convolution. In the embodiment herein described the scale 20 is provided with sixty convolutions and is rigidly fixed to the slider 22, and the scale 18 is provided with 100 convolutions and also has one end fixed to the slider 22. Thus, the 100 convolutions of scale 18 represent the true air speed including the density correction taken from the chart and this true air speed is subdivided into sixty increments on the scale 20, making further conversion for calculation of the distance traversed or the time interval for a given distance, as previously described, unnecessary. These factors may be read directly from the variable scale having sixty convolutions.

This computer may also be employed to determine the true altitude of the aircraft when the pressure altitude and temperature history are known. This may be done in a manner similar to the techniques normally employed with the pastagram as described in the article indicated above. Each vertical division of the thermodynamic chart represents 1000 feet of pressure altitude while each horizontal unit represents .01 "S" units. "S," in constructing this chart, is defined as follows:

$$S = \frac{T - T_p}{T_p}$$

Where T is the actual ambient temperature, $T_p$ is the standard temperature at pressure P as defined for the U. S. standard atmosphere, and S is the specific temperature anomaly.

U. S. standard atmosphere conditions are defined by the vertical line 56, or S=0. The area to the right of this standard line enclosed by a line connecting a plot of the conditions experienced during an ascent comprises a correction factor which must be added to the indicated pressure altitude, while an area to the left of the line S=0 enclosed by a plot of conditions during ascent defines a factor which must be subtracted from the indicated altitude. For example, if upon leaving the ground the atmosphere conforms to the U. S. standard, i. e. S=0, the position on the chart is indicated at point 56. If, at 70,000 feet, S has a value of +50, the point 58 on the chart defines the condition thereat. If it can be assumed that S increased linearly the area between the ordinate representing a pressure altitude of 70,000 feet, the S=0 axis, and a line connected between points 56 and 58 will include a triangular area 70 units high and 11 units wide or a total of 385 units. As each unit square represents a correction factor of 10 feet of actual altitude, the pressure altitude must be increased by 3850 feet, whereby the actual altitude based upon the indicated altitude of 70,000 feet is determined to be 73,850 feet. If the actual plot of pressure altitude vs. specific temperature anomaly is known, a more accurate determination of the correction factor can be made.

The chart herein described may also be employed to determine density altitude. To determine density altitude, that is, the altitude at which a standard atmosphere would have the same density as the atmosphere indicated by the known data, a point is found on the pastagram corresponding to the pressure altitude and temperature and a line parallel to the density correction lines 52 is drawn to intersect the S=0 line. This point of intersection determines the density altitude. For example, the point 60 is at a pressure altitude of 53,000 feet but, because of the temperature of the atmosphere at that point, the density altitude is defined by point 62 which is 49,000 feet. This factor becomes of great consequence in determining the proper adjustments for optimum engine operation.

One other use to which the data available from this computer may be put is the determination of the speed of sound in a given atmosphere and the Mach number of the aircraft flying in said atmosphere. Since the speed of sound is a function of temperature alone the isotherms 64 may be calibrated either in the conventional ambient temperature or they may be calibrated in terms of the speed of sound. To determine the Mach number of an aircraft in a particular atmosphere, determine the point on the thermodynamic chart corresponding to the ambient temperature and read the speed of sound directly from the chart for a given isotherm. Adjust the variable scale 18 so that the distance on an underlying chart representing the speed of sound is enclosed by the full scale. Thenceforth the number of coils overlying a length equal to the aircraft's true air speed is the Mach number of the aircraft at a given time multiplied by a factor of 100. The Mach number may be determined directly from observed information, namely, the distance traversed in a given number of minutes. To utilize this information, a number of convolutions in the 60 coil scale equal to the elapsed time are placed over the traversed distance on the chart. The total length of the sixty unit scale then represents the ground speed which bears a known relationship to the speed of sound as represented on the 100 coil scale.

As shown in Fig. 5 the isotherms 64 are parallel to the S lines 48 for all pressure altitudes above the tropopause, 35,332 feet. Below this altitude the isotherms are angularly disposed at approximately 45° with respect to the S line. This relationship exists because the standard stratosphere region is so defined that the standard temperature $T_p$ is a constant above the altitude of 35,332 feet. Thus, above the 35,000 foot level standard temperature remains constant, while below this altitude it bears a known relationship to altitude and pressure as plotted in the chart which forms a part of this invention. While the various features herein described are combined to form a single integral unit especially adapted for high altitude navigation, it is believed clear that various features such as the physical construction, the use of two related variable scales, and the use of a thermodynamic chart in cooperation therewith produce certain advantages over any computer heretofore known, whether employed singly or in the particular integrated embodiment herein described.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. A computer comprising a transparent planar base member having two parallel edges, one end of said planar on said base member, a thermodynamic diagram impressed on said base member, said diagram including a grid of linear effects arranged in perpendicular and parallel relationship relative to said edges, and a calibrated linearly extensible resilient member having one end secured to said base along one of said parallel edges, the free end of said resilient member being positionable at any one of a plurality of positions along said one edge.

2. A computer comprising a transparent planar base member having tow parallel edges, one end of said planar base being of semicircular form, angle indicating indicia impressed on said semicircular portion of said base, a thermodynamic diagram impressed on said base member, said diagram including a grid of linear effects, each of one set of parallel effects representing a particular value of atmospheric pressure and each of a second set of parallel effects normal to said first set representing a particular value of the specific temperature anomaly, and a calibrated linearly extensible resilient member having one end secured to said base along one of said parallel edges, the free end of said resilient member being positionable at any one of a plurality of positions along said one edge.

3. A computer comprising a planar base member having two parallel edges, a protractor formed on said base member, a thermodynamic diagram impressed on said base member, said diagram including a grid of linear effects, one set of linear effects being parallel lines, each representing a particular value of atmospheric pressure, each of a second set of parallel lines normal to said first set representing a particular value of the specific temperature anomaly, a third set of effects impressed thereon representing ambient temperature, and a fourth set of effects thereon representing an altitude correction factor, and a calibrated linearly extensible resilient member having one end secured to said base along one of said parallel edges, the free end of said resilient member being positionable at any one of a plurality of positions along said one edge.

4. A computer comprising a planar base member having two parallel edges, a protractor formed on said base member, a thermodynamic diagram impressed on said base member, said diagram including a grid of linear effects, a calibrated linearly extensible resilient member having one of its ends secured to said base along one of said parallel edges, the free end of said resilient member being slidably positionable at any one of a plurality of positions along said one edge, a calibrated linearly extensible resilient element having one of its ends secured to said base along the other of said parallel edges, the free end of said resilient element being positionable at any one of a plurality of positions along said other edge, and means interconnecting said free ends to provide coincident movement thereof.

5. A computer comprising a planar base member having two parallel edges, a protractor formed on said base member, a thermodynamic diagram impressed on said base member, said diagram including a grid of linear effects, a calibrated linearly extensible resilient member having one of its ends secured to said base along one of said parallel edges, the free end of said resilient member being slidably positionable at any one of a plurality of positions along said one edge, a calibrated linearly extensible resilient element having one of its ends secured to said base along the other of said parallel edges, the free end of said resilient element being positionable at any one of a plurality of positions along said other edge, said resilient element and said resilient member being respectively calibrated to bear a predetermined relationship to one another, and means to maintain said free ends aligned on an axis normal to said parallel edges and to insure coincident movement thereof.

6. A computer comprising a planar transparent base having two parallel edges, a thermodynamic diagram impressed on said base member, said diagram including a grid of linear effects, a protractor formed on said base member, recessed edge portions formed along each of said parallel edges, resilient calibrated linearly extensible members, one mounted in each of said recesses and having one end thereof secured to said base, and a transverse slide means mounted normal to said edges for movement parallel to said edges, the other ends of said extensible members being secured to the corresponding end of said slide means.

7. A computer comprising a planar transparent base having two parallel side edges, a protractor formed on said base, each side edge having a recess formed therein, calibrated linearly extensible members, one mounted in each of said recesses and each having one end thereof fixed with respect to said base, transverse slide means mounted for movement parallel to said edges, the other end of each of said extensible members being secured to said slide means, and a transparent enclosing member in which said transparent base is disposed, said enclosing member enclosing said extensible members in said recesses, there being means on said enclosing member to guide the ends of said transverse slide means in its movement parallel to said edges.

8. A computer comprising a transparent enclosure including a base member, said base member having a surface forming an outside surface of the enclosure, a protractor formed on said base member and visible exteriorly of said transparent enclosure, transverse slide means mounted for movement upon said base member surface, and calibrated linearly extensible members disposed within said transparent enclosure and visible exteriorly thereof, there being means for effecting coincident movement of said extensible members with said transverse slide means.

9. A computer comprising a transparent enclosure including a base member, a thermodynamic diagram impressed on said base member, said diagram including a grid of linear effects, said base member having a surface forming an outside surface of the enclosure, a protractor formed on said base member and visible exteriorly of said transparent enclosure, transverse slide means mounted for movement upon said base member surface, and calibrated extensible members disposed within said transparent enclosure and visible exteriorly thereof, there being means for effecting coincident movement of said extensible members with said transverse slide means.

10. A computer comprising a planar base member having two parallel edges, a thermodynamic diagram impressed on said base member, said diagram including a grid of linear effects, one set of linear effects being parallel lines, each representing a particular value of atmospheric pressure, each of a second set of parallel lines normal to said first set representing a particular value of the specific temperature anomaly, a third set of effects impressed thereon representing ambient temperature, and a fourth set of effects thereon representing an altitude correction factor, and a calibrated linearly extensible resilient member having one end secured to said base along one of said parallel edges, the free end of said resilient member being positionable at any one of a plurality of positions along said one edge.

References Cited in the file of this patent

UNITED STATES PATENTS

| | | |
|---|---|---|
| 1,969,939 | Nelson | Aug. 14, 1934 |
| 2,985,907 | Weems | Jan. 1, 1935 |
| 2,190,472 | Ferrughelli | Feb. 13, 1940 |
| 2,256,116 | Hughes | Sept. 16, 1941 |
| 2,449,342 | Tardiff | Sept. 14, 1948 |
| 2,530,955 | Gerber | Nov. 21, 1950 |